May 12, 1959   J. M. GUTHRIE   2,886,304
STEEL PRODUCTION
Filed July 23, 1956   3 Sheets-Sheet 1

INVENTOR.
JAMES M. GUTHRIE.
BY
Christy, Parmelee and Strickland
ATTORNEYS.

May 12, 1959   J. M. GUTHRIE   2,886,304
STEEL PRODUCTION

Filed July 23, 1956   3 Sheets—Sheet 2

INVENTOR.
JAMES M. GUTHRIE.
BY
ATTORNEYS.

May 12, 1959 J. M. GUTHRIE 2,886,304
STEEL PRODUCTION
Filed July 23, 1956 3 Sheets-Sheet 3

INVENTOR.
JAMES M. GUTHRIE.
BY
Christy, Parmelee and Struckl
ATTORNEYS.

United States Patent Office 2,886,304
Patented May 12, 1959

2,886,304

STEEL PRODUCTION

James M. Guthrie, Crafton, Pa.

Application July 23, 1956, Serial No. 599,617

5 Claims. (Cl. 266—13)

My invention relates to the production of steel, and consists in certain new and useful improvements in steel plants and in the apparatus and facilities therefor.

The principal objects of the invention are to reduce the cost of steel ingots by an amount ranging from $4.00 to $5.00, or more, per net ton; to increase the production of steel per man hour of labor; to increase by several times the production of each steel-producing furnace or converter; to reduce the capital cost of steel plants per annual ton of ingot production; to minimize the ground and plant areas required for a given production of ingots; and above all to obtain these desiderata by the ready and economical modification of existing steel plants, although recognizing that new steel plants may be initially constructed in accordance with the invention.

Scrap and pig iron form the principal metallic ingredients of which steel is made in open hearth or electric furnaces, and in Bessemer or oxygen-blown converters, and in the ensuing specification the invention will be described, in exemplary way, as it may be used in the production of steel in open hearth furnaces operating on the conventional "hot metal" practice.

In the operation of an open hearth furnace in the modern steel plant, it will be understood that scrap and pig iron, together with lime or limestone, iron ore, and sometimes other non-metallic materials known in the art, are rendered, under the effect of furnace heat and chemical reactions, into a bath of liquid steel that is covered by a blanket of molten slag. The steel is tapped from the furnace into ladles, and from such ladles the steel is cast into ingots, while the molten slag is run off and disposition of it made in the usual way.

In the operation of the latest open hearth shops the scrap is obtained from scrap dealers and from "home," home scrap comprising the steel croppings, shearings and discards from the rolling, forging, casting, and other processing operations in the steel plant. The scrap dealer sorts and classifies the scrap as to metallic composition before delivery is made in railroad cars to the user, and hitherto such scrap received from the dealer (and the "home" scrap too) had to be prepared before it could be charged into the furnaces. More specifically, the scrap is delivered in standard railroad cars to the "scrap preparation yard" of the steel plant, where the heavy scrap is cut or broken into small pieces, and the light scrap is compressed or bundled, in order that it may be loaded into boxes of a size that will pass through the doors of the furnaces to be charged. These boxes, known as charging boxes, are mounted on narrow-gage railway buggies. Trains of buggies, bearing loaded charging boxes, are transported by railroad engines from the scrap preparation yard to the charging floor of the open hearth shop, and on such floor one or more charging machines are mounted to travel on wide-gage rails that are spaced from and extend parallel to the front of the furnace or line of furnaces to be charged. The rails for the trains of loaded charging boxes are narrow-gage, and they extend along the front of the furnaces, between the furnaces and the charging machine rails. A charging machine picks up the loaded charging boxes and passes them one by one through the doors of the furnace being charged, and dumps the loads of scrap into the furnace. When the furnace (which has previously received the usual additions of iron ore, and limestone, etc.) has been charged with the required amount of scrap, and the scrap in the furnace has reached the melting stage, a charge of molten pig iron is poured into the furnace from a hot metal ladle brought by an over-head crane into position before the furnace. After this the furnace is operated in known way to refine the charged materials into a specified "heat" of molten steel, ready for tapping.

The cost of the 100 charging boxes, 25 charging-box-buggies, and one charging machine to serve a single 300 ton open hearth furnace today is approximately $750,000.00, and to this must be added the cost of the railway tracks on the charging floor, tracks running between the charging floor and the scrap preparation yard, the railway engines, and the crane, "skull" crusher and other scrap-preparing facilities in the yard. The elimination of the capital costs and maintenance of these facilities is of great practical importance. I am aware that small floor chargers of the type shown in U.S. Letters Patent No. 2,405,342, granted August 6, 1946, to Edgar E. Brosius, are less costly than the large charging machines mentioned, but Brosius charging machines are too small and slow in operation to charge the scrap required by the furnaces of a modern high-production steel plant.

The charging floor of an open hearth shop is a busy place. The transportation of trains of charging-box buggies to and from the charging floor, and the operation of the charging machines on the floor, creates a congested traffic condition which is recognized as the most serious "bottle neck" in the open hearth shop today.

The cost of preparing scrap for an open hearth furnace varies from $2.00 to $5.00 per ton of scrap. The time required for charging scrap into an open hearth furnace, say a 300 ton furnace, varies from two to four hours, and when a furnace has been charged it requires from one and one-half to three hours to heat the scrap to the point where the "hot" metal—molten pig iron—may be charged. And it only after the mixture of scrap and pig iron has been established in the liquid phase that refinement to ultimate specified analysis can be effected. As a result the usual large open hearth furnace is capabble of making only from two to three 'heats" of steel per day. In the practice of my invention the "heats" of steel per furnace may be at least doubled.

This is accomplished by pre-melting the scrap and charging it in molten condition into the furnace, either while the hot metal is being charged, or before or after the hot metal is charged. As a result the time required for charging the scrap is reduced from two to four hours to from one-quarter to one-half hour. Since the scrap is molten when charged, the usual one and one-half to three hours required for melting the scrap in the furnace is saved, wherefore the steel refining reactions in the furnace may start almost immediately. And it may be noted that the practice of charging the scrap in molten condition into an open hearth furnace particularly lends itself to the recent advent of quickly refining a molten furnace charge by the use of oxygen; that is, by inserting oxygen lances through the furnace roof and playing jets of oxygen upon the molten charge in the furnace.

The art has long recognized the advantages of pre-melting scrap for the charges of steel-producing furnaces, as is evidenced by U.S. Letters Patent Nos. 2,283,-163 and 1,939,874, granted May 19, 1942 and December 19, 1933, respectively, to H. A. Brassert et al., and U.S. Letters Patent No. 935,964, granted October 5, 1909 to J. C. Cromwell et al. In none of the prior art, however, is the costly preparation of scrap eliminated. In order to charge scrap into a cupola, or a blast furnace, or an electric furnace, or into any other of the pre-melting apparatus contemplated by the prior art, the scrap must be prepared by cutting, crushing, or bundling it into sizes that can be charged into the furnace or pre-melting unit.

A cardinal feature of my invention consists in the substantial elimination of scrap preparation, and in the provision of means for pre-melting and superheating unprepared scrap—scrap in the form in which the dealers deliver it, after grading and inspection, in conventional railroad cars to the steel plant. An additional and very important feature of the invention consists in an improved organization of the facilities of an open hearth shop, whereby the operation of the furnaces of the shop with pre-melted unprepared scrap is particularly efficient, such improved organization being designed for the ready conversion of pre-existing open hearth shops to the practice of the invention.

In the accompanying drawings an exemplary embodiment of the invention is illustrated, in which.

Figure 1:
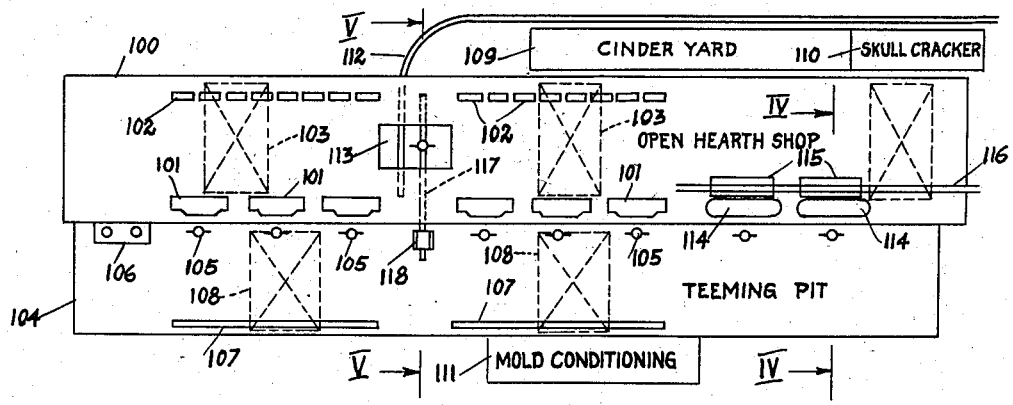
Fig. 1 is a schematic view in plan of an open hearth shop whose facilities are arranged in accordance with the invention.

Referring to the drawings, the apparatus for pre-melting unprepared scrap will be first considered.

Figure 2:
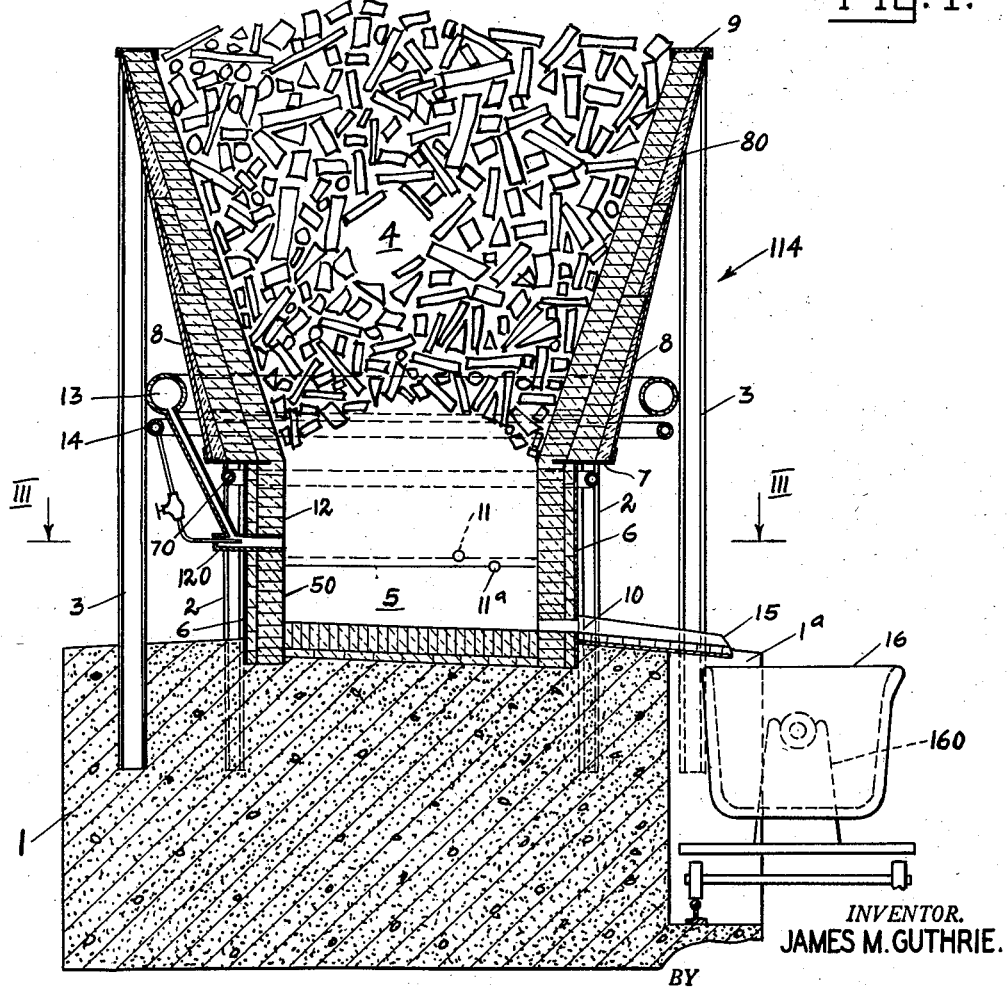
Fig. 2 is a view in vertical cross section, on the plane II—II of Fig. 3, of a furnace for pre-melting unprepared scrap.
Figure 3:
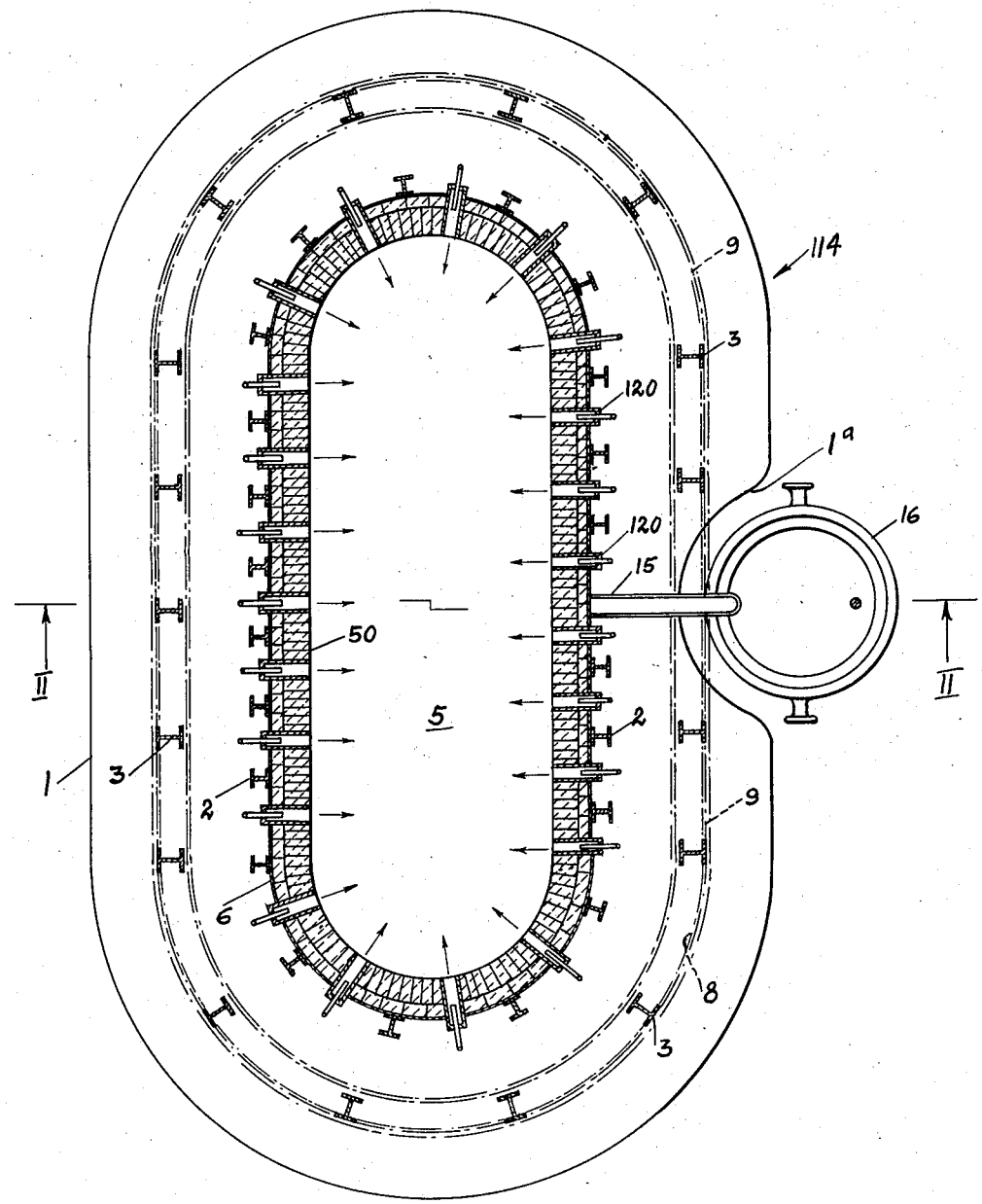
Fig. 3 is a view in horizontal section of the scrap-pre-melting furnace, as seen on the plane II—II of Fig. 2.

Such apparatus comprises a "maw" furnace, such as that illustrated at 114 in Figs. 2 and 3. A single maw furnace may melt and superheat unprepared scrap at a rate to meet the charge requirements of several open hearth or electric steel-producing furnaces; for example, one maw furnace may serve from five to seven 200-ton open hearth furnaces.

The top of the maw furnace is formed with a yawning mouth into which unprepared scrap may be mass charged directly from the railroad cars in which the scrap is delivered to the open hearth shop. Advantageously, a car-dumper may be in novel combination with the furnace and arranged to discharge a complete car of from 50 to 100 tons of unprepared scrap into the furnace.

The charge of scrap in the maw furnace extends downward from the top of the furnace in a column that may range from ten to twenty-five feet in height. Beneath the column of scrap in the furnace, fuel burners develop an intense heat, and below the burners a hearth forms a receptacle for holding more than the quantity of super-heated molten steel scrap required for an open hearth charge.

As will presently appear the heat developed in the furnace melts the scrap at the lower end of the column, while the products of combustion rise through the column and preheat the scrap above the melting zone and while it is descending through the furnace hopper. The efficiency of the furnace is above 80%, as compared with a scrap-melting efficiency of approximately 32% of the conventional open hearth furnace.

The maw furnace is lined with neutral refractory material such as 70% alumina, or chrome, or magnesite brick, and the furnace is fired in such manner as to yield high temperatures, with products of combustion that are highly oxidizing. During the melting and superheating of the scrap a preliminary refining of the metal takes place; that is, parts of the silicon, manganese, carbon and iron are oxidized. The oxides of carbon escape with the products of combustion of the fuel, while the oxides of iron and manganese combine with the silica to form a highly oxidizing slag which is collected with the molten scrap delivered into the ladle for transfer to the open hearth furnace.

In order to insure that the superheat of the molten scrap will be high enough, the melt is checked by one of the known methods. If it be found that the temperature is too low, an oxygen jet is applied upon the surface of the melt until the temperature is raised to the desired value.

When the melt is tapped for charging an open hearth furnace, a sample is taken and quickly analyzed for its carbon content and other elements in order that the composition of the solution of the molten scrap with the hot metal in the open hearth may be predetermined. To those skilled in the art it will be readily apparent that this procedure permits a reasonably accurate forecast or predetermination of the carbon content in the molten bath provided in the open hearth furnace, and this in advance of the time when analyses are normally made. In consequence the time required for working down or adjusting the final carbon content in the bath of steel in the open hearth is very substantially reduced.

As indicated in Fig. 2, the maw furnace of the invention may rest upon a foundation 1 of reinforced concrete, and to this foundation vertical supports 2 and 3 of structural steel are provided for the furnace walls. This foundation in plan may conform to the shape of the furnace, except for a recess 1a opposite a tap hole 10, and in some three to four feet larger in horizontal plan dimensions than the top (9) of the furnace, as indicated in Fig. 3. The vertical supports 2 and 3 are preferably steel beams of H-section, equi-spaced about the furnace, and of a number and size amply to support the entire weight of the hopper-like upper part 4 of the furnace. The hearth 5 of the furnace may rest directly upon the foundation, and comprises a brick lining 50 encased and laterally supported in a shell 6 of steel plate. The beams 2 support a peripheral mantel 7, upon which rests a steel shell 8 and refractory lining 80 of the hopper 4, except for the course of brick-work directly above the refractories 50 of the hearth side wall. The steel shell 8 is welded or bolted to the mantel 7, and to a rim of steel channel 9 that surmounts the wall of hopper portion 4. The channel 9 is securely fastened by welding or bolting to the supporting beams 3. The rim 9 serves to protect the top layers of brick work from impact when scrap is charged into the open mouth at the top of the furnace.

The refractory lining of the furnace is installed within the erected shell portions 6 and 8, as follows: The entire bottom of the furnace is first covered with a layer of first quality fire brick laid on edge upon a layer of refractory mortar or castable refractory so that the bottom slopes slightly in all directions from the side walls towards the tap hole 10. Next, the bottom is covered with a layer of magnesite brick laid dry on end, and the tap hole is either formed of the same brick or is set-in as a preformed hole in a rectangular block of alundum. In any event, the tap hole is located so that its lowest tangent coincides with the top surface of magnesite brick to permit the furnace to be completely drained of metal and slag at each tap, if so desired. The diameter of the tap hole is varied from 2 to 4 inches, according to the size of the furnace, so that the furnace may be drained of molten metal within a few minutes after the tap hole is opened.

The side walls of the hearth are then laid-up of the same materials, with a 2½ to 4 inch layer of first quality fire brick laid dry next to the shell 6, and with a 9 inch inner wall of magnesite brick laid on edge, or with two such layers with the brick laid on end. From 20 to 36 inches above the bottom a slag notch 11 of about 3 inches in diameter, formed of an alundum block, is inserted at a point from 4 to 5 feet to one side of the tap hole. Instead of being formed of an alundum block, the slag notch may be constructed as a slot 2½ x 4 inches included in the brick work, the brick adjacent to the slot comprising a magnesite brick.

To make accommodation for delays in tapping, and also to gauge the depth of molten metal, a slag hole 11a may be set at from 8 to 10 inches below the notch 11. In this case the lower slag hole must be round and not over 2 inches in diameter, so that it can be plugged to permit metal to rise to the level of the slag notch 11.

On a level of from 4 to 8 inches above the center of the slag notch 11 burner blocks 12 are set in the hearth side walls. These blocks are made of alundum. They are set or formed to direct the flame slightly downward, and in plan such burner blocks are arranged to project the flames as indicated by the arrows in Fig. 3.

Upon the installation of the burner blocks, the erection of the brick in the hearth wall is continued vertically upward to the mantel 7, which is located on a level about 24 inches above the slag notch, making the total depth of the hearth from 52 to 56 inches. Above the mantel the magnesite brick are continued for about 24 inches in stepped-back courses backed by second quality fire brick next to the shell, which extends upward at an angle of 15 degrees to the vertical, and 75 degrees to the horizontal, to a total height ranging from 10 to 25 feet, depending upon the size of the furnace. Above this height the hopper may be extended upward to any desired distance to give the desired width of the mouth, with a corresponding increase in the efficiency of the furnace. As shown in Fig. 2 of the drawings the width of the open mouth of the furnace is relatively great, as required for the mass charging of unprepared scrap. The width of the open mouth of the furnace may range from ten to twenty five feet or more. The magnesite brick portion of the lining 80 is topped by several courses of first quality fire brick, and at the top of the furnace the lining may comprise second quality fire brick laid in a refractory mortar to hold the brick securely in place.

The angle which the side wall of the hopper forms with the vertical may be varied from a minimum of about 12½ degrees to a maximum of about 45 degrees, although an angle greater than 30 degrees is not recommended for two reasons: First, it is desirable to have the scrap in contact with the sloping wall free or adapted to move steadily downward, and since the minimum angle of repose for steel in contact with brick is about 25 degrees from the horizontal or 65 degrees from the vertical, an angle of 45 degrees leaves the slope only 20 degrees steeper than the angle of repose. Considering that the brick work presents many joints and that the scrap has many sharp edges that may slip into these joints at all angles, the scrap is not likely to move down an angle of 45 degrees, and may not even move downward readily when the angle is 30 degrees. Again, as the scrap descends to the top of the hearth, its temperature is raised to near the fusion point. At this temperature the scrap becomes "sticky," and, in contact with the sloping wall of the hopper, requires considerable force to move it down and over the edge of the mantel. There are also other reasons for making the hopper walls steep, and these reasons will be pointed out later.

Regarding the holding capacities of the furnace: The holding capacity for molten metal varies directly as the area of the hearth 5, while the holding capacity of the hopper for unmelted scrap varies as the height times the average or mean area of the top and bottom of the hopper portion 4.

Following the laying of the brick lining the melting burners 120 are installed to project their flames through the burner blocks 12, and each burner is connected to the fuel and air (or fuel, air and oxygen) bustle pipes 13 and 14, respectively, that are carried by the vertical beams 3, and extend about the furnace on a level of from 7 to 8 feet above the top of the foundation 1. If air is used alone with the fuel, it should be preheated to above 1000 degrees F. to obtain a flame temperature high enough to melt the scrap rapidly. This preheating may be effected in a suitable heat exchanger, located near the furnace but not shown in the drawings. The heat supply for the exchanger may be obtained from the combustion of a small portion of the same fuel used in the premelting furnace, or from some other convenient source of heat available in the steel plant.

For small furnaces the fuel is preferably a gaseous fuel, such as town gas or natural gas, but in the case of larger furnaces they may be fired with either a gaseous fuel or a liquid fuel, such as fuel oil. With either or with both types of fuel, preheating of the air is unnecessary when oxygen is used to enrich the combustion air, and not only is the melting rate increased thereby, but also the efficiency of the furnace is increased.

It is to be noted that no cooling plates, such as are used in the bosh walls of a blast furnace, are required in the furnace of the present invention. However, in operation, particularly when starting up a new furnace, it is well to provide a water line to the furnace with a hose connection so that water may be sprayed upon any hot spot that may appear on the shell. And, if desired, a small bustle pipe 70, in which a circulation of cooling water is maintained, may be installed, as shown, to dissipate heat from the mantel or bosh plate 7.

After all connections have been made and tested, the furnace is conditioned for operation by drying it out and then preheating the bottom to a temperature of at least 1600 degrees F. This conditioning is accomplished, as follows: First, the open maw or mouth of the furnace is completely covered with sheet iron or light weight steel plates; the slag notch 11, slag hole 11a and tap hole 10 are left open. Then, one of the burners, preferably the one opposite the tap hole is turned on and permitted to burn for several hours, or until the temperature of brick within the hearth of the furnace has reached a temperature of at least 300 degrees F. Next, additional burners in sets of three are turned on at successive intervals of about an hour, and the heating is continued until the hearth brick begins to show color when viewed through the slag notch and tap hole when all the burners momentarily are turned off. If the bricks have been nicely laid, this heating will cause them to expand sufficiently to close the cracks at the joints almost completely. In any case the heating is continued until the first scrap can be charged, at which time the bottom brick will have been raised to 2000 degrees F.

For the first charge a number of long pieces of relatively heavy scrap are selected and lowered vertically one by one until the lower end of each rests upon the bottom of the furnace at the center or center line. The top end of each long piece of scrap is caused to lean aaginst the wall of the open maw or hopper portion 4 of the furnace. The successive pieces of scrap are leaned alternately against one side of the hopper portion 4 and then on the other. The cone or V-shaped rack thus formed is filled to slightly above the bosh or mantel line with light scrap and portion 4 is filled as quickly as possible with miscellaneous scrap. All burners are then turned on full and the tap hole is closed either with a plug of graphite machined to fit the hole or with grain magnesite mixed with a little pitch or tar and pushed into the hole. Then, these materials are backed by plugs of wet clay which are rammed into place until the hole is completely filled. Thereafter, the furnace is operated continuously with all burners turned on full, except when it becomes necessary to reduce the melting rate, which can be accomplished most conveniently by shutting off one or more of the burners. Alternately, the melting rate can be controlled by leaving all burners on and reducing the rate of firing.

About two hours after the furnace has been fully charged and the burners have been operating on full firing, the scrap in the combustion zone at the bottom of the column begins to melt, and as such scrap melts more descends from the hopper to take its place, causing a noticeable sinking of the scrap at the open top of the furnace. At this point, normal charging of scrap into the furnace is begun, and is effected either continuously or in frequent intervals, at a rate to keep the hopper heaping full.

Charging of the furnace is accomplished in railroad carload lots. For example, a railway ramp may be provided, extending from ground level to a car-dumper located adjacent to the top of the furnace, whereby carloads of scrap may be run from ground level to the open top of the furnace and dumped directly into the furnace. Alternately, carloads of unprepared scrap may be dumped upon a platform sloping to the top of the furnace, so that the dumped scrap will slide from the platform into the furnace. If required, the unprepared scrap charged into the top of the furnace may be spread or distributed by means of an electro-magnet or heavy poker carried by an overhead crane.

In modification, a combination elevator-dumper apparatus may be installed adjacent to the furnace, and loaded railway cars of unprepared scrap may be run at ground level into place on such apparatus, and then elevated to the top of the furnace and dumped.

The loading of unprepared scrap in large quantities into the open maw at the top of the furnace may, for purposes of distinction, be termed mass charging, and the car-dumper apparatus, later described herein, is illustrative of the several mechanical expedients effective to such end.

If from time to time accelerated melting in the furnace is needed, or if correction in the charge distribution in the column of scrap in the furnace is in order, a lance may be projected into the furnace and a jet of oxygen played upon the hot scrap at the required points. The oxygen burns portions of the steel scrap with which it comes into contact, and the great amount of heat thus generated serves to speed-up the melting of the scrap, and to deplete any unbalanced concentration of scrap at a given region in the furnace. Orifices in the side walls of the hopper portion of the furnace may be provided for the insertion of such an oxygen lance, such openings as the slag notches or holes shown at 11 and 11a in Fig. 2 in the walls of the combustion zone of the furnace.

In preparation for tapping the furnace, the attendants place a pouring spout 15 in front of the tap hole 10, and position a ladle 16 under the outer end of the spout. The ladle may be supported on a set of conventional stationary ladle stands 160, where the ladle is accessible to an overhead crane for handling, both for the purpose of placing the ladle in position to receive the molten metal, and to remove the filled ladle and transport it to the steel-producing open hearth or electric furnace to be charged. Alternatively, the ladle stands may be supported on a railroad car, so that the ladle may be transported by rail between the position in the plant where the ladle may be received by the usual hot metal crane that serves the open hearths or other metal-refining furnaces.

When the ladle is placed, as shown in Fig. 2, to receive molten scrap from the maw furnace, the lining of the ladle is kept hot by lowering a flaming burner (not shown) to its bottom. In the maw furnace the lower slag notch is, if necessary, stopped to retain metal in the furnace in the event that tapping cannot be made on predetermined schedule and the bath of molten scrap rises above normal level. When the molten metal rises in the furnace to the upper slag notch the furnace should be tapped.

To tap the furnace, the tap hole is opened by removing the clay and most of the plug with a motor driver auger. If the auger encounters solid metal, an oxygen lance is inserted and the metal burned out of the hole. The heat thus generated usually opens the hole quickly, permitting the molten metal stored on the hearth to flow through the spout into the ladle. When the furnace is drained the flow of metal stops and the tap hole is re-closed or plugged in the manner already described. If the metal is still flowing when the ladle is filled, the flow is stopped instantly by inserting a graphite stopper attached to the end of a long steel bar into the tape hole. As soon as the flow is stopped, the steel bar is withdrawn and the hole is securely plugged with clay. Then, the operation of the maw furnace is initiated again and continued in preparation for the next tap.

In order to effect melting at the maximum rate for a given furnace, a flame temperature of 3200 to 3300 degrees F. is desired. The fuel required to attain such melting is delivered to a large number of burners 120 distributed, as shown, about the periphery of the hearth, and these burners are so designed and set so as to concentrate the heat at the center or along the center line of the furnace. Bearing in mind that the hot products of combustion must rise from this melting zone and pass upward through the interstices or voids in the body of scrap in the open-topped hopper portion, it will be understood that most of the sensible heat of the rising flames and products of combustion will be absorbed by the colder scrap above, with the consequence and effect that the scrap will be heated to a temperature between its solidus and liquidus points during the time the scrap descends from the top to the bottom of the hopper portion. Upon reaching the bottom of the hopper portion or bosh only a part of the heat of fusion, or less than $\frac{1}{7}$ of the heat required to melt cold scrap, is needed to complete the melting of the hot scrap. Since the liquidus point is near 2750 degrees F., and since the flame temperature is above 3200 degrees F., there is a temperature difference of 450 degrees F., which promotes a very rapid heat absorption by the scrap, with the result that the steel melts quickly and drips through the hot zone into the bath upon the hearth.

If the walls of the hopper portion or maw above this zone were vertical, as in a cupola, the scrap would drop to the hearth in solid form and in large masses. Such descent of solid scrap to the hearth would not only interfere with the functioning of the burners but would also lower the flame temperature. In the maw furnace of my present invention the upper furnace walls are sloping, so that as the scrap descends it is moved toward the furnace center line, thereby more or less compressing the scrap inwardly under the effect of its own weight. The scrap is thus caused to form a self sustaining arch over the hottest zone of the hearth.

In order that the scrap shall arch as desired over the hearth, the laterally acting compressive forces must push the descending scrap toward the center line of the furnace above the plane of the bosh or mantel (7). The compressive forces must be great enough to push the scrap, moving downward along the wall, inward with sufficient pressure to retard the vertical drop of the column of scrap to a rate exactly equivalent to the rate at which the melting proceeds. In the furnace design of this invention the scrap at and immediately above the mantel plane, being very hot, is relatively weak and can be bent or otherwise deformed, with a small fraction of the force required to deform it cold. Furthermore, the scrap melts with a "sweating action"; that is, the metal at the surface of each piece of scrap melts and falls in drops through the combustion zone. This melting decreases the space occupied by the scrap by nearly one-half, and if the scrap along the side walls of the hopper portion 4 is not pushed inward at a steady rate, the flames may cut a channel upwardly through the center of the scrap column. As the weight of the scrap is the only force available for the purpose, the force necessary to accomplish these objects is obtained by sloping the walls of the hopper portion at an angle of from 15 to 18 degrees from the vertical for furnace of round section in plan, or from 19 to 23 degrees for large oval furnaces of the sort illustrated herein. The exact optimum angle depends upon the kind of refractory lining in the sloped walls of the furnace and the physical characteristics of the scrap to be melted.

The hot flames and gaseous products of combustion, which are at their maximum temperature and volume in the combustion zone formed by the upper part of the hearth, give up their heat to the scrap most rapidly and completely, because the melt must drop through the gases and these gases can escape from the furnace only by passing upwardly through the interstices in the body of scrap above. Obviously, the melting of the scrap is effected by heat transfer from these gases to the scrap at all temperatures up to the liquidus point. The furnace of the present invention provides for the transfer to the scrap of substantially all of the heat developed by a complete combustion of the fuel, except for the heat lost by radiation, which amounts to less than 12%. This high efficiency is obtained by so charging the scrap as to keep the furnace full. The heat of fusion of the scrap, which is melted in the arch formed over the hearth, plus 120 degrees F. superheat, absorbs about 16% of the heat liberated by combustion of the fuel, causing the temperature of the products of combustion to drop about 500 degrees, that is, to a temperature of about 2750 degrees F., as they enter the bottom of the hopper or maw portion of the furnace. In the hopper portion conditions are most favorable for the transfer of all the sensible heat of the gases to the scrap. Briefly, these conditions are: First, the weight of the products of combustion formed in melting one ton (2000 lbs.) of scrap is slightly less than 1100 lbs., but the specific heat of the gases is a little more than twice the specific heat of the scrap, so that for equal weights of scrap and combustion products the temperature change varies directly as the heat transfer, and the drop in temperature of the gases equals the increase in temperature of the scrap. Since the gases formed in melting a quantity of scrap must pass upwardly through the interstices in a mass of scrap at least ten times as heavy, it follows that the total heat contained by the gases cooled to 150 degrees F. is sufficient to raise the average temperature of the scrap only 343 degrees F., and the average temperature of the scrap at the top of hopper will be less than 200 degrees F.

It is also to be noted that the temperature of the gases leaving the top of the column of scrap depends upon the rate of heat transfer, which in turn is determined by the rate of the upward flow of the gases and the ability of the steel to absorb heat. Since steel is a fairly good conductor of heat, heat applied to the surfaces of a piece of scrap is rapidly transferred towards the center of the piece. However, the rate of heat transfer is retarded as the size of section increases. The rate of heat transfer is also retarded by scale, rust, or other foreign matter on the surfaces of the scrap. The rate of flow of the gases upward is determined by the volumes of the gases and the total cross sectional area of the interstices through which they must flow. The latter area is almost a fixed quantity, being 38% to 42% of the total volume occupied by the scrap in the hopper. The volume of the gases varies widely, being about 300 times that of the scrap at the temperature at which they escape.

The influence of the scale, rust, etc., in retarding heat transfer is largely offset by other factors favoring the transfer of heat. For example, as the hot gases pass upwardly through the interstices formed by the scrap, they are continuously "wiping" all surfaces of the scrap, a condition that greatly increases the rate of heat transfer. Also, as the gases pass upwardly, their temperature and volume are constantly decreasing, whereas the volume of the interstitial spaces through which they must flow is constantly increasing, due to the outwardly flared hopper or bosh walls. As a result of these two factors, the rate of flow leaving the furnace is usually less than six feet per second. Consequently, the gases not only leave the top of the furnace at a relatively low temperature, but they are relatively free from dust and fumes, as compared with the gases of an open hearth furnace while melting scrap. It will be understood, therefore, that the maw furnace goes a long way toward the elimination of the smoke and fumes normally developed during the melting of scrap in open hearth furnaces, and thus a nuisance which has become acute in recent years is alleviated.

As distinguished from the furnaces of the prior art, which are adapted to melt prepared scrap, my furnace is not closed at the top by means of a removable cover or "bell." The wide-open maw of my furnace is important for the mass processing of unprepared scrap. If the furnace is located in a building and it is desired to conduct the escaping gases out of the building a simple hood (not shown) may be mounted above the top of the furnace at such an interval as not to interfere with the charging of the furnace. The top of this hood may be connected to a stack extending through the building roof. Owing to the low temperature of the escaping gases, this stack does not require a refractory lining. It may be simply constructed of light steel plate or heavy hot rolled sheet steel, although it is to be noted that the maw furnace may be operated without a hood.

Tilting open hearth furnaces have long been known in the art. Such furnaces are tilted to permit the flushing of slag and the removal of finished heats of steel. If desired, my scrap-premelting furnace may have the hearth portion arranged for tilting movement when molten scrap is to be removed, and it is deemed needless to involve this specification with an illustration or description of such a detailed modification in design. It is merely a matter for the engineer skilled in the art.

By virtue of my improved apparatus for the mass charging and premelting of unprepared scrap, the modern open hearth shops may be so constructed and their facilities so organized that the objects and advantages referred to in the forepart of this specification are realized. For example:

In Fig. 1 an open hearth shop is indicated by the rectangular line 100, including a battery of six open hearth furnaces 101, and bins 102 for limestone, ore and other materials required in the production and refinement of steel in the furnaces. Two overhead traveling cranes 103 are indicated in dotted lines for serving the open hearth furnaces. Adjacent to the open hearth shop is the conventional teeming pit 104, which is provided with stands (not shown) to support ladles 105 in position to receive the finished "heats" of steel produced in each furnace, together with such slag-overflow ladles (not shown) as are normally used with the steel ladles. Within the teeming pit building a ladle-lining pit 106 is provided, and two teeming platforms 107. The teeming pit area is served by two traveling overhead cranes indicated by dotted lines 108. The floor of the teeming pit normally lies at the ground elevation or level of the plant, and is provided with a system of railroad tracks, which are not shown but will be readily understood by those skilled in the art. A cinder yard 109, skull cracker 110 and mold-conditioning facilities 111 are provided as adjuncts to the open hearth shop. It may be noted that the scrap preparation yard of the prior shops is not required and is not shown. In the conventional open hearth shop the ground floor, sometimes called the cellar or kitchen floor, is at common level with the floor of the teeming pit, while at a height of from 18 to 24 feet thereabove the open hearth shop includes a charging floor, above which the bodies of the open hearth furnaces rise. It is on this charging floor that the furnace operating crews and furnace charging facilities function.

According to prior practice the elaborate and costly charging machines travel on charging-floor tracks that parallel the line of furnaces, and by means of such charging machines the loaded boxes of scrap are picked up from the buggies, projected through a door of the furnace being charged, and dumped. The limestone, ore and other materials going into the furnace charge are also placed in boxes and charged in the same way as the scrap, but at proper time in the furnace-operating cycle. When a furnace has been fully charged with its burden of scrap, the hot metal is added, as mentioned in the early part of this specification.

Various arrangements are used to handle the hot-metal (molten pig iron) coming from a blast furnace. Usually, the molten pig iron is placed in a mixer and conditioned. From the mixer the quantity of hot-metal required for the particular open hearth charge is poured into a hot-metal ladle mounted on a railway car, and on such car is transported into a convenient point on the open hearth charging floor, where one of the overhead cranes 103 picks up the ladle from the car and carries it into position above the receiving end of a hot-metal spout that has been previously placed to extend through a door of the open hearth furnace to be charged. The hot-metal is then poured from the ladle into the spout, whence it flows into the furnace.

Figure 4:
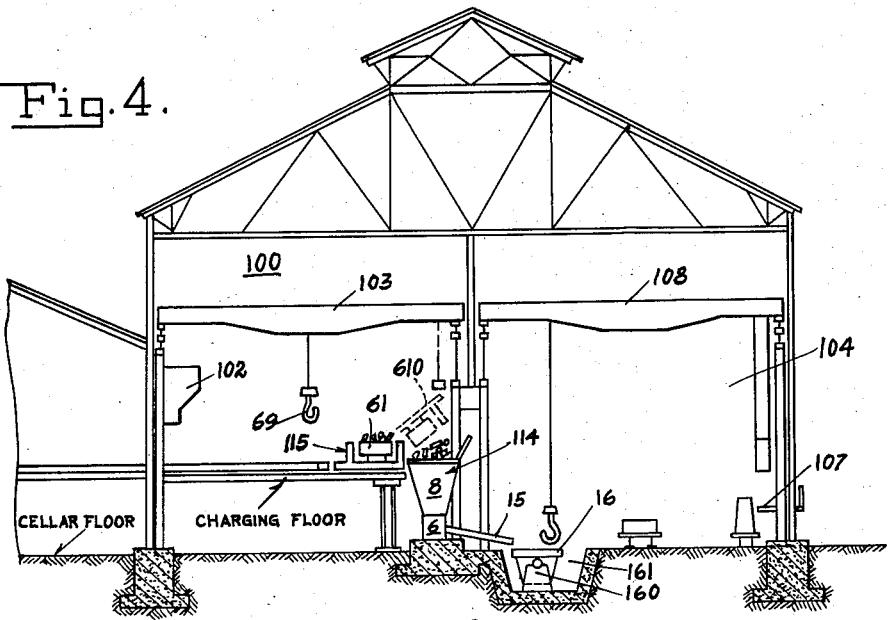
Fig. 4 is a fragmentary view, showing in diagrammatic vertical cross section the illustrated open hearth shop, the plane of section being indicated at IV—IV in Fig. 1.
Figure 5:
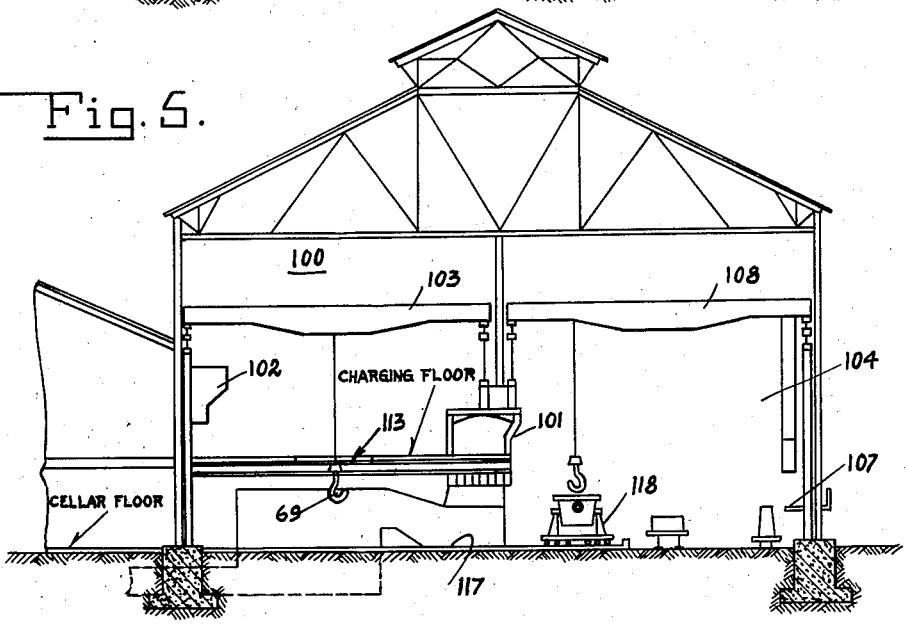
Fig. 5 is a similar cross-sectional view of the open hearth shop, as seen on the plane V—V of Fig. 1.

Figs. 4 and 5 illustrate in schematic cross section the open hearth side and teeming isle or pit of the plant outlined in plan in Fig. 1. As distinguished from the usual practice of running the hot metal charging ladles on railroad tracks upon the elevated charging floor of the shop, such hot metal ladles may be transported at ground level on tracks 112 (cf. Figs. 1 and 5) into position below a hatchway 113 provided in the charging floor, whence an overhead crane 103 may lift the loaded ladle through such hatchway and carry it into position for charging the desired one of the open hearth furnaces 101. This plant arrangement permits the mixer to be located at a convenient point removed from and lower than the charging floor. The mixer need be elevated above ground level only so far as required to pour hot metal into a hot metal ladle. Thus, the need for a hot metal "high line" or elevated track may be avoided. If a mixer is not used, and the molten pig iron is brought from the blast furnace in "torpedo" or "bottle" ladles, the transfer station (that is, the station conventional in the use of the latter ladles, where the pig iron is poured into hot metal ladles) may be most conveniently located, and the loaded hot metal ladles run into position beneath the hatchway 113, where they are accessible to an overhead ladle crane 103.

It is important to note that the maw furnace and its associated facilities are arranged to permit the handling of the molten scrap by means of the otherwise essential overhead cranes in the shop. Comparing Figs. 1 and 4, it will be noted that two maw furnaces 114 are installed in the plant, in this case in alignment with the open hearth furnaces 101. One maw furnace may be used as a standby while the other is in service. Preferably, if not necessarily, the maw furnaces are installed in such position that the open tops or maws of the furnaces are accessible for charging scrap from or slightly above charging floor elevation, as by means of car-dumpers 115.

Figure 6:
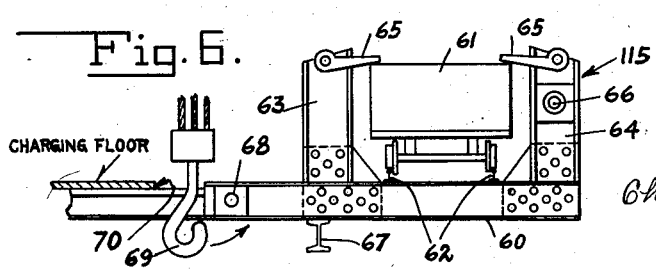
Fig. 6 is a view in end elevation of a certain car-dumper which apepars diagrammatically in Figs. 1 and 4.

Each car-dumper comprises a structural steel base 60 (Fig. 6) having rails 62 upon which a railroad car 61, loaded with from forty to one hundred tons of unprepared scrap, may be run from the railway system supplying the plant. Rising from the base 60 are two sturdy side structures 63 and 64, equipped with a series of clamps 65 that are powerfully operated to clamp the body of car 61 along its two sides and lock it in position in the car-dumper. The mechanism for powerfully clamping the car in the dumper is not shown herein, since the provision of such mechanism is merely a matter for the engineer. The base of the car-dumper may lie in substantially common plane with the charging floor of the shop; the car-dumper is supported along one side (64) by a heavy shaft 66 journaled in suitable standards incorporated with the steel structure of the open hearth building, and along the other side 63 by a rigid pedestal beam 67. The aligned transverse beams of the base 60 are extended as cantilevers, and in the ends of such cantilevers a heavy bail-rod 68 is secured for engagement, at the longitudinal center of the car-dumper structure, by the hook 69 of one of the overhead cranes 103, such hook being lowered through a window 70 in the charging floor and engaged from below to the bail-rod, as indicated by the arrow in Fig. 6. Then, the overhead crane is operated to lift and swing the car-dumper about the axes 66 into the dotted line position 610 shown in Fig. 4, whereby the load of steel scrap in the car is mass charged into the adjacent maw furnace. Thus, the furnace may be charged quickly and economically with unprepared scrap.

The railroad scrap cars may be run into position upon either car-dumper 115 by means of a "high line" track 116 (Fig. 1) leading from the railway system supplying the plant. Alternatively, the track 115 may enter the open hearth shop at ground level, and each car-dumper may be mounted upon an elevator adapted to raise it into position for dumping adjacent to the top of the associated maw furnace. This specification need not be prolonged with an illustration and description of such elevators, which are matters for the steel plant engineer.

As shown in Fig. 4 the ladle 16 for receiving a charge of superheated molten scrap may be supported on ladle stands 160 in a pit 161 in the teeming aisle 104 of the shop, in position to receive the metal delivered by spout 15 from a furnace 114 during tapping. In the plant arrangement of Fig. 4, the foundation 1 of the furnace 114 need not be recessed as shown at 1a in Figs. 2 and 3.

When a charge of molten metal has been delivered into the ladle 116 a ladle crane 108 lifts the loaded ladle from the stands 160 and pit 161 and transports it along the teeming pit to a traversing track 117 at ground level. The loaded ladle is placed upon a ladle car 118; cf. Figs. 1 and 5, which is then shifted upon track 117 into position beneath the hatchway 113 in the charging floor. One of the overhead hot metal cranes 103 picks up the ladle, lifts it through the hatchway, and carries it to the open hearth furnace 101 to be charged in the manner already described. If in particular shops this use of one of a teeming pit crane 108 interferes with ingot casting procedure, the ladle 116 may be mounted on the car 118 beneath the delivery chute 15 of the maw furnace being tapped and a track system provided to transport the loaded ladle car into position beneath the hatchway 113.

It may be noted that the hatchway 113 has been provided intermediate the length of the charging floor of the open hearth shop, whereby the travel of the cranes 103 in servicing a line of steel-producing furnaces 101 may be minimized. In modification the intermediate hatchway may be eliminated, and the tracks 112—117 may be arranged to deliver the hot metal and molten scrap ladles into a pick-up station adjacent to either end of the charging floor, where they are accessible to the cranes 103. Again, one or both of the maw furnaces may be installed intermediate the row of furnaces 101 for convenience in plant operation, and to minimize the travel and service time of the overhead cranes 103 and 108.

Those skilled in the art will appreciate that the premelting of mass charged, unprepared scrap in accordance with this invention may be applied to electric furnace shops and converter plants for the production of steel. It is realized that in certain electric furnace shops the tops of the furnaces are removable, and large drop-bottom buckets or containers of special and costly design, filled with scrap, are lowered into the furnaces and the scrap is deposited upon the hearths of the furnaces. Indeed, the same procedure has been proposed for open hearth furnaces. The fact is, however, that furnaces having removable tops are very expensive to construct, and their operating and maintenance costs are relatively high. Furthermore, the scrap must be prepared and loaded into the said special scrap-charging containers, with the effect that the preparation and rehandling of scrap in the steel plant is not avoided, but remains as a substantial item of the "cost above" expenditures in the production of steel.

Various modifications in the structures and structural organization described in the foregoing specification may be made within the spirit of the invention defined in the appended claims.

Notice is given of my application Serial No. 305,803, filed August 22, 1952, now abandoned, of which earlier application the application for these Letters Patent comprised a continuation-in-part.

I claim:

1. In combination a maw furnace having a combustion chamber, a hopper portion rising and flaring laterally from said chamber to an extended mouth for the reception of unprepared steel scrap, means including a car-dumper for mass charging from conventional railway cars unprepared steel scrap into said extended mouth and forming a column of scrap in said hopper portion, and burner means for firing said combustion chamber and premelting and superheating the scrap preparatory to charging it into a steel-producing unit.

2. In combination a maw furnace having a combustion chamber, a columnar receptacle portion rising from said combustion chamber to a mouth of a width adequate for the charging of unprepared steel scrap thereinto, a hearth below said combustion chamber adapted to contain a bath of molten metal, means including a car-dumper for mass charging from conventional railway cars unprepared steel scrap into said mouth to maintain a column of scrap in said columnar receptacle portion, and burner means for firing said combustion chamber between said hearth and receptacle portion to premelt said unprepared scrap and provide a superheated batch of molten scrap for charging a steel-producing unit.

3. A steel plant having an aisle with an elevated charging floor, a teeming pit having a floor at lower level than said charging floor, a plurality of steel-producing furnaces arranged to be serviced from said elevated charging floor, a maw furnace for premelting unprepared steel scrap, means for mass charging unprepared scrap into said maw furnace, a ladle for charging molten metal into said steel-producing furnaces, an overhead crane above said charging floor for handling the charging ladle, a ladle for receiving the molten steel from said steel-producing furnaces, an overhead crane above said teeming pit for handling the steel-receiving ladle, and a traversing track extending between said aisle and pit and at a level below said charging floor for transporting ladles between positions of accessibility to the overhead crane above the elevated charging floor and to the overhead crane serving the teeming pit therebelow.

4. A steel plant having an aisle with an elevated charging floor, an elongate teeming pit extending parallel to, adjacent to, and below said charging floor, a line of furnaces for producing steel from charges comprising steel scrap, said furnaces rising above said elevated charging floor whereby the furnaces may be served from said floor, ladles and means for supporting them in said teeming pit to receive molten steel tapped from said furnaces, a plurality of overhead cranes mounted to travel above said pit for handling the ladles in the pit, a maw furnace for premelting steel scrap, means including a car-dumper for mass charging scrap from conventional railway cars into said maw furnace, ladles and means for supporting them below charging floor level for receiving premelted molten scrap from said maw furnace, and a plurality of overhead cranes mounted to travel above said charging floor for raising ladles of premelted scrap from below charging floor level and transporting them above charging floor level into position to pour the premelted scrap selectively into said steel-producing furnaces.

5. A steel plant having an aisle with an elevated charging floor, an elongate teeming pit extending parallel to, adjacent to, and below said charging floor, a line of furnaces for producing steel from charges comprising steel scrap, said furnaces rising above said elevated charging floor whereby the furnaces may be served from said floor, ladles and means for supporting them in said teeming pit in position to receive molten steel tapped from said furnaces, a plurality of overhead cranes mounted to travel above said pit for handling said ladles in the pit, a maw furnace for premelting steel scrap, means including a railway car-dumper for mass charging scrap from conventional railway cars into said maw furnace, ladles and means for supporting them below charging floor level for receiving premelted molten scrap from said maw furnace, a hatchway opening through the charging floor at a point intermediate the extent of said line of steel-producing furnaces, means below charging floor level for transferring ladles of premelted scrap from said maw furnace into position beneath said hatchway, and overhead cranes mounted to travel above said charging floor for raising said ladles of premelted scrap through said hatchway to above charging floor level and transporting such ladles above charging floor level into position to pour the premelted scrap selectively into said steel-producing furnaces.

References Cited in the file of this patent

UNITED STATES PATENTS

| 935,964 | Cromwell | Oct. 5, 1909 |
| 1,489,073 | Fitzgerald | Apr. 1, 1924 |
| 2,283,163 | Brassert et al. | May 19, 1942 |
| 2,551,278 | Millan | May 1, 1951 |

FOREIGN PATENTS

| 1,993 | Great Britain | 1794 |
| 724 | Great Britain | 1869 |
| 113,027 | Germany | Aug. 30, 1900 |
| 734,890 | France | Oct. 29, 1932 |

OTHER REFERENCES

Making, Shaping, and Treating of Steel, 6th edition, pages 405 to 411. Published in 1951 by United States Steel Co.